(12) United States Patent
Chou et al.

(10) Patent No.: US 8,719,444 B2
(45) Date of Patent: May 6, 2014

(54) CLOUD COMMANDS

(75) Inventors: Randy Yen-pan Chou, San Jose, CA (US); Ravi Mulam, San Jose, CA (US)

(73) Assignee: Panzura, Inc., San Jose, CA (US)

( * ) Notice: Subject to any disclaimer, the term of this patent is extended or adjusted under 35 U.S.C. 154(b) by 737 days.

(21) Appl. No.: 12/772,806

(22) Filed: May 3, 2010

(65) Prior Publication Data

US 2011/0270803 A1 Nov. 3, 2011

(51) Int. Cl.
*G06F 15/16* (2006.01)
(52) U.S. Cl.
USPC .......................................................... 709/234
(58) Field of Classification Search
CPC ............................ H04L 63/10; H04L 67/1097
USPC .......................................................... 709/234
See application file for complete search history.

(56) References Cited

U.S. PATENT DOCUMENTS

| | | | |
|---|---|---|---|
| 7,069,307 B1* | 6/2006 | Lee et al. | 709/217 |
| 7,660,829 B2* | 2/2010 | Steere et al. | 707/999.2 |
| 2004/0243644 A1* | 12/2004 | Steere et al. | 707/200 |
| 2007/0106858 A1* | 5/2007 | Galipeau et al. | 711/162 |
| 2008/0098043 A1* | 4/2008 | Galipeau et al. | 707/201 |

* cited by examiner

*Primary Examiner* — Jerry Dennison
(74) *Attorney, Agent, or Firm* — Park, Vaughan, Fleming & Dowler LLP

(57) ABSTRACT

An apparatus and a method for delegating commands for a network attached storage system is described. A command permission associated with a command to be executed on a Network Attached Storage (NAS) server is delegated to a user of a NAS client having a mounted network filesystem of the NAS server. The command is issued through the filesystem of the NAS client.

20 Claims, 4 Drawing Sheets

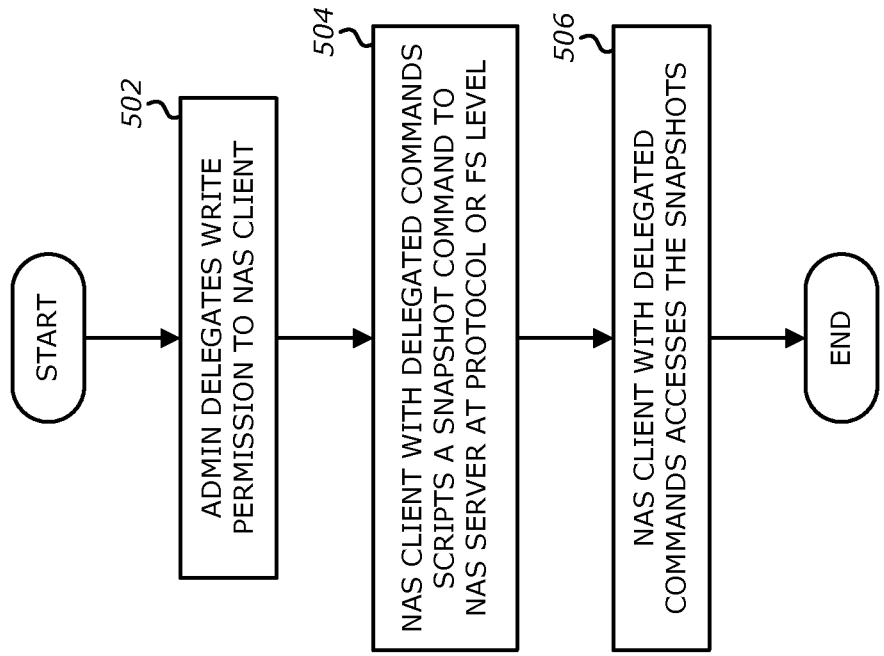
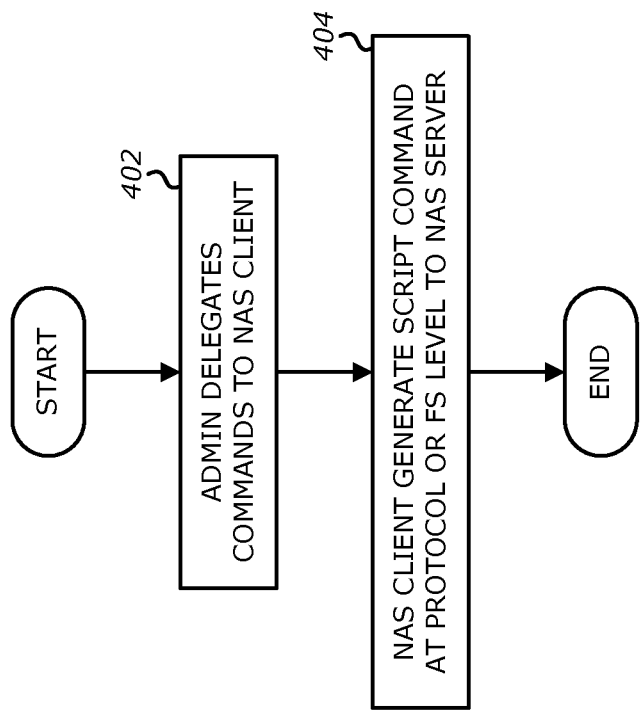

CLOUD COMMANDS

TECHNICAL FIELD

Embodiments of the present invention relate to computing systems, and more particularly, to Network Attached Storage (NAS) systems and cloud storage.

BACKGROUND

A network attached storage ("NAS") system is a processing system adapted to store and retrieve data on behalf of one or more client processing systems ("clients") in response to external input/output requests received from clients. A NAS system can provide clients with file-level access to data stored in a set of mass storage devices, such as magnetic or optical storage disks or tapes.

Configuration, maintenance, and support of a NAS system have evolved from simple NFS mount points to sophisticated support for multiple versions of NFS/CIFS. FIG. 1 is a block diagram illustrating a conventional Network Attached Storage (NAS) system. A NAS client 102 mounts one or more filesystems from a NAS server 106 using a mounting protocol 104 such as Network File System (NFS) or Common Internet File System (CIFS). For example, NAS server 106 includes two exportable volumes: /vol/mnt1 and /vol/mnt2 that are mounted onto NAS client 102 respectively as /mnt1 and as a drive letter such as z:\.

As such, client file /mnt1/file1 on NAS client 102 corresponds to a file on NAS server 106 /vol/mnt1/file1. Similarly, client file z:\file2 on NAS client 102 corresponds to a file on NAS server 106 /vol/mnt2/file2.

NAS client 102 accesses files in /mnt1 or z:\ based on security settings on each file 112, 114 or directory.

An administrator 108 of the NAS server 106 can create snapshots 110 of the NAS server 106 on a timely basis (hourly, daily, weekly). For example, snapshots 110 are then accessible under:

/mnt1/.hourly/file1 (corresponding to NAS server's /vol/mnt1/file1 from an hour ago); and z:\.weekly/file2 (corresponding to NAS server's /vol/mnt2/file2 from a week ago).

Access to most configurations of NAS server 106 are typically limited to either the administrator of the NAS server 106 and/or a user with specific rights to login to the NAS server 106 through a Web User Interface or a Command Line Interface for such configuration, support, and maintenance.

Sophisticated features added to NAS server 106 such as snapshots, mirroring, database synchronization, virtual machine provisioning, are not only useful to the administrator of NAS server 106, but these features have also become part of applications and end users' day to day operation needs. For instance, a user may frequently need to be able to snapshot and mirror important data when large amounts of changes are done in his working set storage.

Conventionally, the user is either forced to submit a change request to the administrator 108 of NAS server 106 for such tasks or make use of NAS server 106 vendor-provided so called plug-ins 103 into the application to make use of this. Plug-ins 103 frequently have limited functionality and do not have as extensive security and rights attributes as the files that reside on them have. Plug-ins 103 also only exist for specific applications that the NAS Server 106 vendor supports. Also, plug-ins 103 are frequently for specific Operating Systems where the applications may run as they require binary builds of the specific feature.

BRIEF DESCRIPTION OF THE DRAWINGS

The present invention is illustrated by way of example, and not by way of limitation, in the figures of the accompanying drawings and in which:

FIG. 4 is a flow diagram illustrating one embodiment of a method for delegating commands to a NAS client.

FIG. 5 is a flow diagram illustrating an example of a method for delegating snapshot commands to a NAS client.

DETAILED DESCRIPTION

A system for delegating commands for a network attached storage system is described. A command permission associated with a command to be executed on a Network Attached Storage (NAS) server is delegated to a user of a NAS client having a mounted network filesystem of the NAS server therein. The command is issued through the filesystem of the NAS client.

Figure 1:
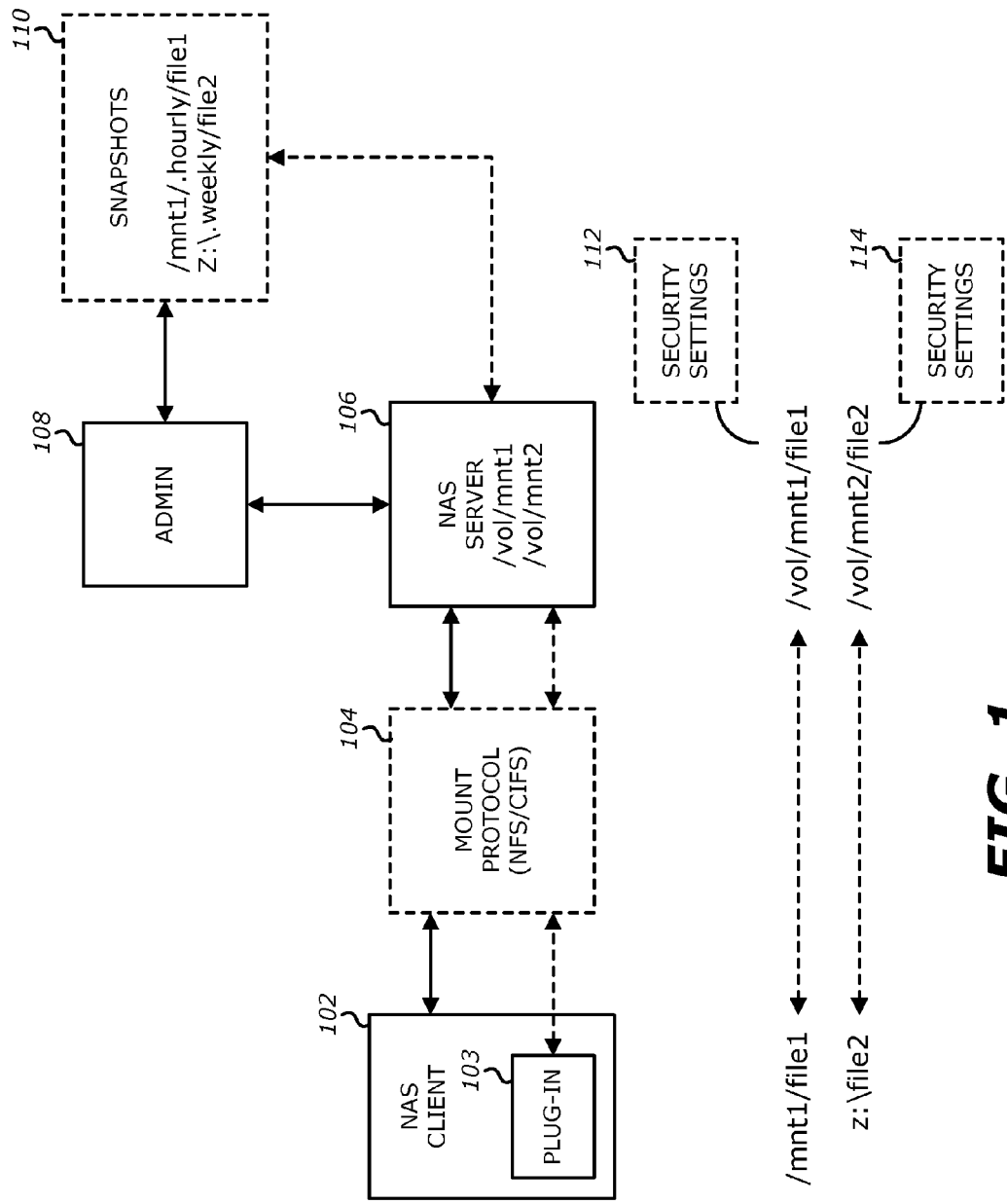
FIG. 1 is a block diagram illustrating a conventional system for accessing a Network Attached Storage (NAS) in accordance with a prior art.
Figure 2:
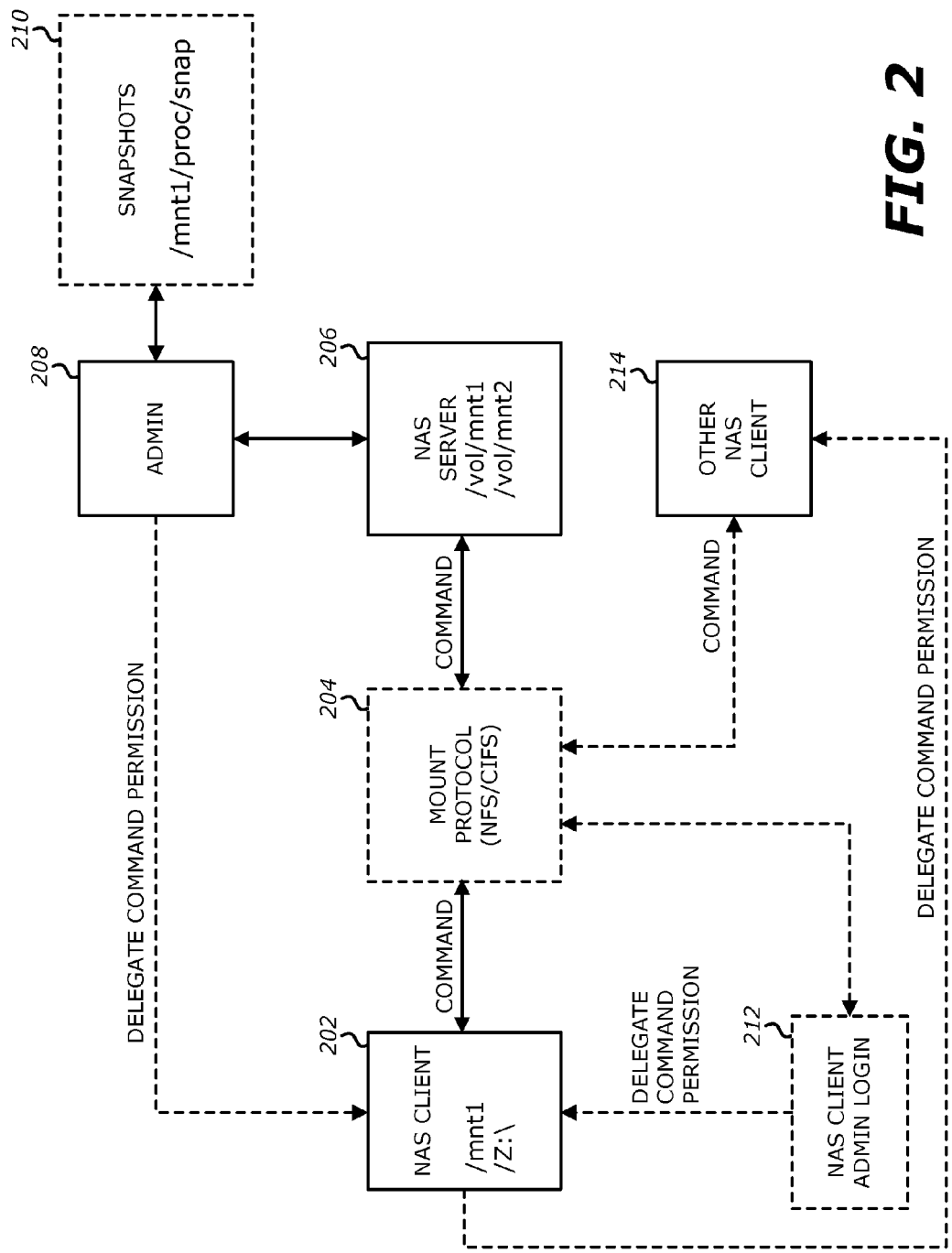
FIG. 2 is a block diagram illustrating one embodiment of a system for accessing a NAS server.

FIG. 2 is a block diagram illustrating one embodiment of a system for accessing a NAS server 206. A NAS client 202 mounts one or more filesystems from NAS server 206 using a mounting protocol 204 such as Network File System (NFS) or Common Internet File System (CIFS). Those of ordinary skills in the art will recognize that other mounting protocols may be used. In one embodiment, NAS client 202 communicates with NAS server 206 via a computerized network (e.g. the Internet).

NAS server 206 includes for example, two exportable volumes: /vol/mnt1 and /vol/mnt2 that are mounted onto NAS client 202 respectively as /mnt1 and as a drive letter such as z:\.

As such, client file /mnt1/file1 on NAS client 202 corresponds to a file on NAS server 206 /vol/mnt1/file1. Similarly, client file z:\file2 on NAS client 202 corresponds to a file on NAS server 206 /vol/mnt2/file2.

In order for NAS client 202 to perform a command on NAS server 206 without intervention from the administrator on every occasion, an administrator of NAS server 206 delegates permission with respect to specific commands to NAS client 202 via a console of the NAS server (not shown) or another NAS client. Examples of commands that can be delegated include snapshots, mirroring, database synchronization, virtual machine provisioning among other end user's day to day operation needs. Those of ordinary skills in the art will recognize that other commands besides the previously mentioned can be delegated.

For illustration purposes, FIG. 2 shows an administrator 208 delegating a snapshot command permission to NAS client 202 to create and access snapshots 210. In particular, to allow NAS client 202 to write and access snapshots 210, administrator 208 delegates write permission to /mnt1/proc/snap in snapshots 210. The delegation of such permission can also be done on a range of NAS client machines 212, for example using a command-line command such as:

echo "permit write user1">z:\proc\snap

Another exemplary command syntax for this command could include:

Echo "enable">z:\proc\snap\permit?write?user1

The delegated commands are scriptable commands that can be issued from any client operating through the filesystem. Similar to commands issued in /proc under Linux, the use of such commands and status can be expanded to support administrative commands for an NAS. So, for example, a command from NAS client 202 to take a snapshot of this directory based on the above system would be:

echo "snapshot">/mnt1/proc/snap

NAS client 202 would then be able to access such snapshot 210 at /mnt1/proc/<date and time>/file1.

As such, the NAS commands (snapshots, mirroring, etc. . . . ) pass through in the same connection as the NAS is mounted through NFS/CIFS. There is no new additional port or connection, and no change on NAS client side itself. Furthermore, because all commands flow through the filesystem, no additional firewall rules between NAS client 202 and NAS server 204 need to be created or adjusted.

In another embodiment, NAS client 202 in turn delegates its delegated command permission from administrator 208 to another NAS client 214. This other NAS client 214 is then authorized to place the delegated command to NAS server 206 without requiring another permission from administrator 208.

Delegation of security attributes are already what the network filesystem supports (which has gone through IT security auditing). All users that can be delegated to already exist and can make use of such system (whether AD, Kerberos™, LDAP, Radius™ TACACS . . . no longer matters).

It should also be noted that plug-ins are no longer required in NAS client 202 to issue permitted commands to NAS server 206. Vendors associated with NAS server 206 no longer need to implement every possible sophisticated security feature or create application plugins for NAS 202.

Most applications such as databases, email/exchange, virtual machines such as VMWare or XEN, have built-in scripting inside the application itself. Thus, a very simple end-user can create a script that manages the NAS server. The vendor of NAS server 206 is no longer needed to create and support such tasks in allowing application integration. The integration can now be done by an end-user of NAS client 102, VAR, or outsourced groups from the vendor or partner.

Figure 3:
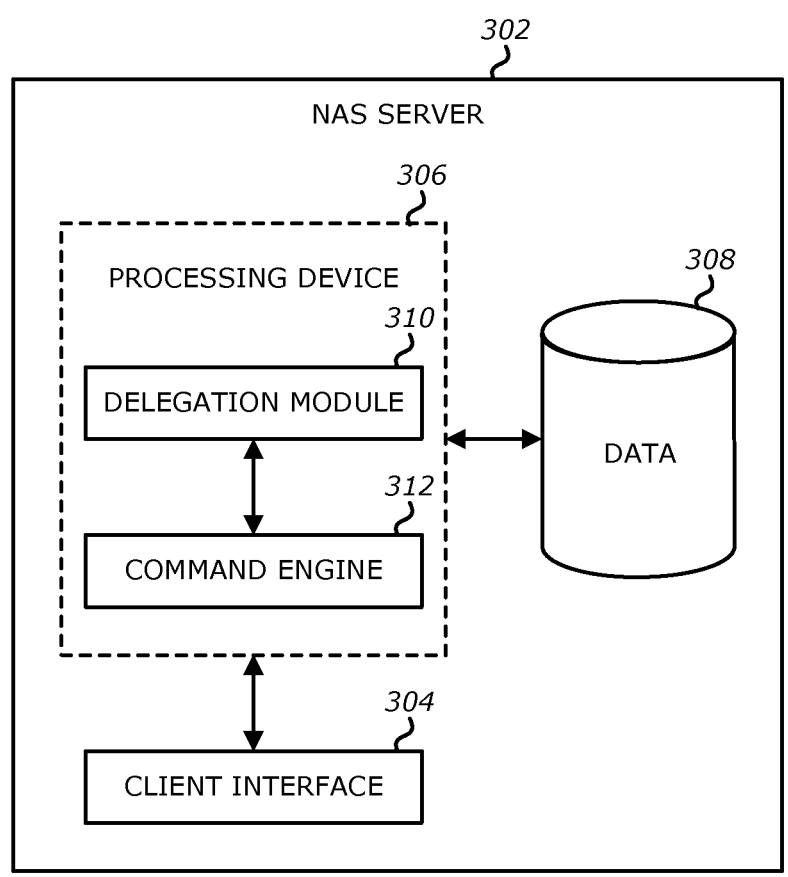
FIG. 3 is a block diagram illustrating one embodiment of a NAS server.

FIG. 3 is a block diagram illustrating one embodiment of a NAS server 302. NAS server 302 comprises a NAS client interface 304, a processing device 306, and a networked storage device 308.

NAS client interface 304 is configured to communicate with NAS client 202. For example, NAS client interface 304 can include a network interface card or module.

Processing device 306 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 306 may also be one or more special-purpose processing devices such as an application specific integrated circuit (ASIC), a field programmable gate array (FPGA), a digital signal processor (DSP), network processor, or the like.

Processing device 306 comprises a delegation module 310 and a command engine 312. Delegation module 310 is configured to delegate a command permission associated with a command to be executed on networked storage device 308 to a user of a NAS client having a mounted network filesystem of NAS server 302 therein.

Command engine 312 is configured to receive a command at the filesystem level of the NAS client and client interface 304 or at a protocol level of the NAS client. Command engine 312 can also execute the command on networked storage device 308, and communicates a result of the executed command back to the NAS client. For example, the command includes taking and accessing a snapshot of at least a portion of the networked storage device 308.

In one embodiment, delegation module 310 is configured to communicate with an administrator of the NAS server who is accessing the NAS server from another NAS client. In another embodiment, delegation module 310 receives a command from another NAS client that has been delegated the command permission from an NAS client with the delegated command permission.

Networked storage device 308 is configured to store data to be accessed by NAS clients. In one embodiment, networked storage device 308 includes a memory or a data storage device. Memory can include a read-only memory (ROM), flash memory, dynamic random access memory (DRAM) such as synchronous DRAM (SDRAM), or a static memory (e.g., flash memory, static random access memory (SRAM), etc.). Data storage device may include a computer-accessible storage medium on which is stored one or more sets of instructions embodying any one or more of the methodologies or functions described herein.

Delegation module 310 and command engine 312 may also reside, completely or at least partially, within a main memory and/or within the processing device 306 during execution thereof by NAS server 102. The main memory and the processing device 306 also constitute computer-accessible storage media. The software may further be transmitted or received over a network via the network interface device.

FIG. 4 is a flow diagram illustrating one embodiment of a method for delegating commands to a NAS client. At 402, an administrator of NAS server delegates a command permission associated with a command to be executed on the NAS server to a user of a NAS client having a mounted network filesystem of the NAS server. In one embodiment, the commands include but are not limited to snapshots, mirroring, database synchronization, and virtual machine provisioning. Such delegation would allow the user on the NAS client to execute the command without seeking an administrator in the process. In one embodiment, the administrator delegates by accessing the NAS server from another NAS client.

At 404, NAS server receives the command at the filesystem level or protocol level of the NAS client with delegated command permission. In another embodiment, the NAS client with delegated command permission can delegate the command permission to another NAS client. Delegation may include forming a pseudo filesystem on the NAS client for the delegated command.

In one embodiment, NAS server executes the command and communicates the result of the command to NAS client.

FIG. 5 is a flow diagram illustrating an example of a method for delegating snapshot commands to a NAS client. At 502, an administrator of the NAS server delegates a command permission associated with a command to be executed on the NAS server to a user of a NAS client having a mounted network filesystem therein of the NAS server. At 504, NAS client with delegated snapshots permission scripts a snapshot command to NAS server at a protocol or filesystem level. At 506, NAS client is allowed to write and access the snapshots.

In one embodiment, delegating is performed with an administrator of the NAS server accessing the NAS server from another NAS client.

While the computer-accessible storage medium is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for initiating an administrative command on a Network Attached Storage (NAS) server, the method comprising:
    establishing a network connection from an NAS client to the NAS server to mount on the NAS client a filesystem that is hosted by the NAS server;
    receiving from an administrator for the NAS server a delegated command permission associated with the administrative command, wherein the delegated command permission is associated with a first user on the NAS client, wherein the delegated command permission is presented by the NAS server to the first user using an abstraction of a pseudo file in the mounted filesystem, wherein the pseudo file gives the first user access to the administrative operation, wherein the first user invokes the delegated command permission by requesting a filesystem I/O operation that operates upon the pseudo file without executing the pseudo file, wherein the established network connection is used to convey the requested filesystem I/O operation for the pseudo file from the NAS client to the NAS server; and
    upon receiving notice of the requested filesystem I/O operation for the pseudo file at the NAS server, initiating the administrative command on the NAS server;
    wherein the established network connection is also used by the NAS client to perform file operations on data files stored in the filesystem that is hosted by the NAS server; and
    wherein access to the delegated command permission is controlled using filesystem security abstractions for the filesystem that are applied to the pseudo file.

2. The computer-implemented method of claim 1,
    wherein the filesystem hosted by the NAS server includes one or more directories that comprise a pseudo filesystem that supports administrative commands; and
    wherein initiating the administrative command further comprises initiating the filesystem I/O operation upon a virtual file in the pseudo filesystem.

3. The computer-implemented method of claim 2,
    wherein the administrative command comprises performing in the NAS server a snapshot operation for the filesystem hosted by the NAS server;
    wherein upon completing the snapshot operation, the NAS server is configured to provide to the NAS client access to snapshotted versions of files created during the snapshot operation in the pseudo filesystem; and
    wherein the NAS client accesses the snapshotted versions of files by initiating subsequent filesystem I/O operations upon the pseudo filesystem.

4. The computer-implemented method of claim 3, wherein the administrative command initiates:
the snapshot operation;
a mirroring operation that mirrors one or more files in the filesystem;
a database synchronization operation that synchronizes and stores database data in the filesystem; and
a virtual machine provisioning operation.

5. The computer-implemented method of claim 4,
wherein receiving the delegated command permission enables at least one of the first user and an application associated with the first user to initiate one or more administrative commands for the filesystem on the NAS client without needing to request additional permissions from the administrator for the NAS server; and
wherein the administrator delegates the delegated command permission to the first user using filesystem security attributes.

6. The computer-implemented method of claim 5,
wherein the first user receiving the delegated command permission delegates the delegated command permission to a second user without intervention from the administrator; and
wherein the second user initiates the administrative command without needing to request permissions from the administrator for the NAS server or the first user.

7. The computer-implemented method of claim 6,
wherein the application that is associated with the first user executes on the NAS client and initiates the administrative command using a built-in script that accesses the mounted filesystem using filesystem protocols; and
wherein initiating administrative commands and delegating administrative command permissions by using filesystem I/O operations and filesystem security attributes facilitates performing administrative commands in the NAS server without requiring: plug-in support in the NAS server, executing plug-ins in NAS clients, any additional ports or connections between the NAS client and NAS server, changes on the NAS client side, and additional firewall rules or adjustments between NAS clients and the NAS server.

8. A non-transitory computer-readable storage medium storing instructions that when executed by a computer cause the computer to perform a method for initiating an administrative command on a Network Attached Storage (NAS) server, the method comprising:
establishing a network connection from an NAS client to the NAS server to mount on the NAS client a filesystem that is hosted by the NAS server;
receiving from an administrator for the NAS server a delegated command permission associated with the administrative command, wherein the delegated command permission is associated with a first user on the NAS client, wherein the delegated command permission is presented by the NAS server to the first user using an abstraction of a pseudo file in the mounted filesystem, wherein the pseudo file gives the first user access to the administrative operation, wherein the first user invokes the delegated command permission by requesting a filesystem I/O operation that operates upon the pseudo file without executing the pseudo file, wherein the established network connection is used to convey the requested filesystem I/O operation for the pseudo file from the NAS client to the NAS server; and
upon receiving notice of the requested filesystem I/O operation for the pseudo file at the NAS server, initiating the administrative command on the NAS server;
wherein the established network connection is also used by the NAS client to perform file operations on data files stored in the filesystem that is hosted by the NAS server; and
wherein access to the delegated command permission is controlled using filesystem security abstractions for the filesystem that are applied to the pseudo file.

9. The non-transitory computer-readable storage medium of claim 8,
wherein the filesystem hosted by the NAS server includes one or more directories that comprise a pseudo filesystem that supports administrative commands; and
wherein initiating the administrative command further comprises initiating the filesystem I/O operation upon a virtual file in the pseudo filesystem.

10. The non-transitory computer-readable storage medium of claim 9,
wherein the administrative command comprises performing in the NAS server a snapshot operation for the filesystem hosted by the NAS server;
wherein upon completing the snapshot operation, the NAS server is configured to provide to the NAS client access to snapshotted versions of files created during the snapshot operation in the pseudo filesystem; and
wherein the NAS client accesses the snapshotted versions of files by initiating subsequent filesystem I/O operations upon the pseudo filesystem.

11. The non-transitory computer-readable storage medium of claim 10, wherein the administrative command initiates:
the snapshot operation;
a mirroring operation that mirrors one or more files in the filesystem;
a database synchronization operation that synchronizes and stores database data in the filesystem; and
a virtual machine provisioning operation.

12. The non-transitory computer-readable storage medium of claim 11,
wherein receiving the delegated command permission enables at least one of the first user and an application associated with the first user to initiate one or more administrative commands for the filesystem on the NAS client without needing to request additional permissions from the administrator for the NAS server; and
wherein the administrator delegates the delegated command permission to the first user using filesystem security attributes.

13. The non-transitory computer-readable storage medium of claim 12,
wherein the first user receiving the delegated command permission delegates the delegated command permission to a second user without intervention from the administrator; and
wherein the second user initiates the administrative command without needing to request permissions from the administrator for the NAS server or the first user.

14. The non-transitory computer-readable storage medium of claim 13,
wherein the application that is associated with the first user executes on the NAS client and initiates the administrative command using a built-in script that accesses the mounted filesystem using filesystem protocols; and
wherein initiating administrative commands and delegating administrative command permissions by using filesystem I/O operations and filesystem security attributes facilitates performing administrative commands in the NAS server without requiring: plug-in support in the NAS server, executing plug-ins in NAS clients, any additional ports or connections between the NAS client and NAS server, changes on the NAS client side, and additional firewall rules or adjustments between NAS clients and the NAS server.

15. A network storage system comprising:
a Network Attached Storage (NAS) server; and
a NAS client;
wherein the NAS client establishes a network connection with the NAS server to mount on the NAS client a filesystem hosted by the NAS server;
wherein the NAS client is configured to receive from an administrator for the NAS server a delegated command permission associated with an administrative command, wherein the delegated command permission is presented by the NAS server to the first user using an abstraction of a pseudo file in the mounted filesystem, wherein the pseudo file gives the first user access to the administrative operation, wherein the first user invokes the delegated command permission by requesting a filesystem I/O operation that operates upon the pseudo file without executing the pseudo file, wherein the established network connection is used to convey the requested filesystem I/O operation for the pseudo file from the NAS client to the NAS server; and
wherein, upon receiving notice of the requested filesystem I/O operation for the pseudo file at the NAS server, the NAS server initiates the administrative command on the NAS server;
wherein the established network connection is also used by the NAS client to perform file operations on data files stored in the filesystem that is hosted by the NAS server; and
wherein access to the delegated command permission is controlled using filesystem security abstractions for the filesystem that are applied to the pseudo file.

16. The network storage system of claim 15,
wherein the filesystem hosted by the NAS server includes one or more directories that comprise a pseudo filesystem that supports administrative commands; and
wherein initiating the administrative command further comprises initiating the filesystem I/O operation upon a virtual file in the pseudo filesystem.

17. The network storage system of claim 16,
wherein the administrative command comprises performing in the NAS server a snapshot operation for the filesystem hosted by the NAS server;
wherein upon completing the snapshot operation, the NAS server is configured to provide to the NAS client access to snapshotted versions of files created during the snapshot operation in the pseudo filesystem; and
wherein the NAS client accesses the snapshotted versions of files by initiating subsequent filesystem I/O operations upon the pseudo filesystem.

18. The network storage system of claim 17, wherein the administrative command initiates:
the snapshot operation;
a mirroring operation that mirrors one or more files in the filesystem;
a database synchronization operation that synchronizes and stores database data in the filesystem; and
a virtual machine provisioning operation.

19. The network storage system of claim 18,
wherein receiving the delegated command permission enables at least one of the first user and an application associated with the first user to initiate one or more administrative commands for the filesystem on the NAS client without needing to request additional permissions from the administrator for the NAS server; and
wherein the administrator delegates the delegated command permission to the first user using filesystem security attributes.

20. The network storage system of claim 19,
wherein the first user receiving the delegated command permission delegates the delegated command permission to a second user without intervention from the administrator; and
wherein the second user initiates the administrative command without needing to request permissions from the administrator for the NAS server or the first user.

* * * * *